Inventor:
Ralph S. Schmidt

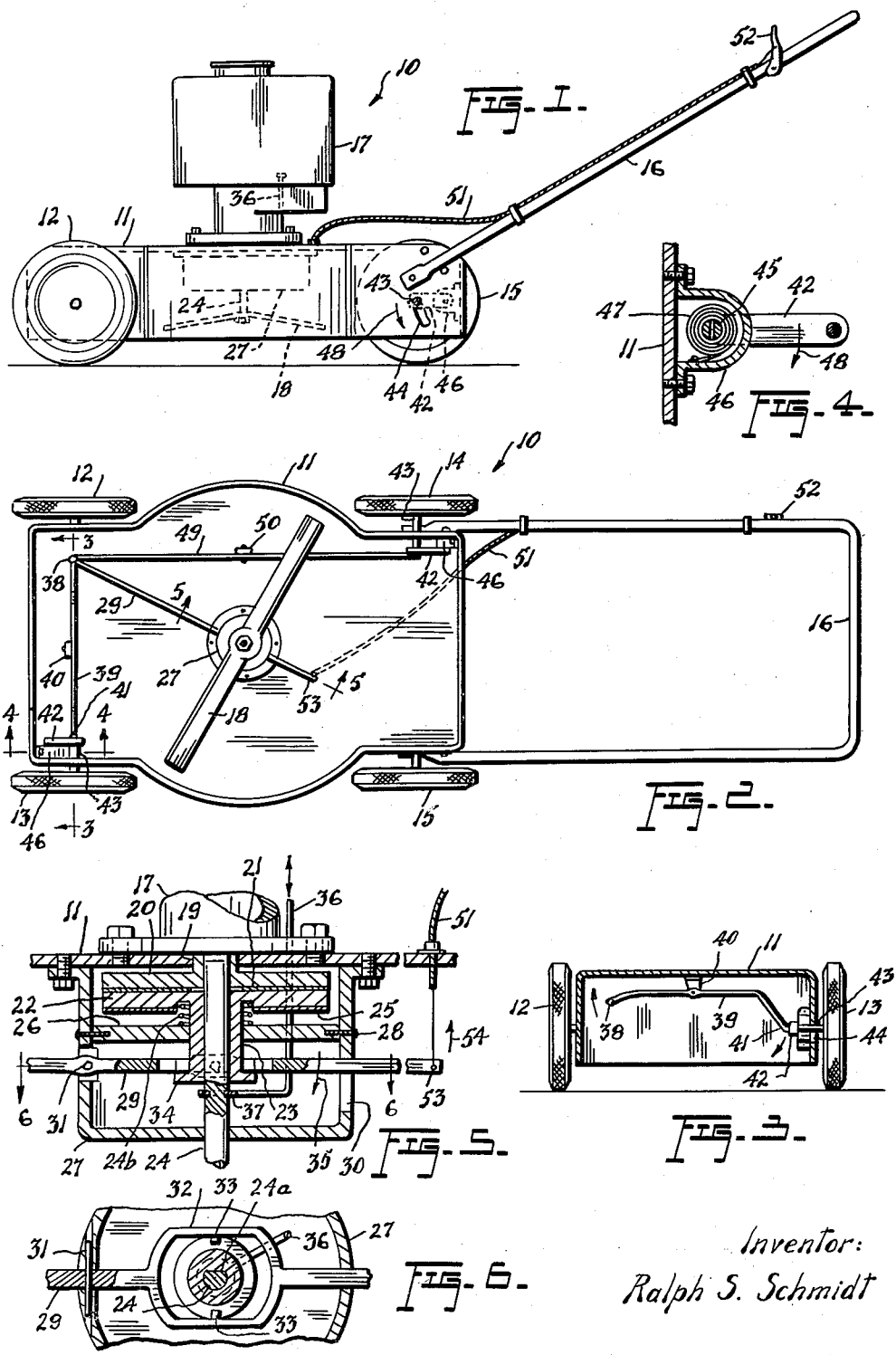

United States Patent Office 2,993,329
Patented July 25, 1961

2,993,329
POWER LAWN MOWER WITH GUARD-OPERATED CLUTCH MEANS
Ralph S. Schmidt, 7848 Eagle St., Wauwatosa, Wis.
Filed June 18, 1958, Ser. No. 742,902
3 Claims. (Cl. 56—25.4)

This invention relates to new and useful improvements in power lawn mowers of the type having a rotary cutter disposed under a wheeled frame or housing, and the principal object of the invention is to positively safeguard against possible injury of the operator by stones, etc., flying from the cutter, or by coming in contact with the cutter itself, when the housing of the mower is raised too much above the ground, such as for example, while travelling over uneven terrain.

The above object is achieved by providing the frame or housing of the mower with at least one wheel which is movable upwardly and downwardly relative to such frame or housing, together with means for automatically interrupting the operation of the cutter when the movable wheel is lowered relative to the frame, as in the example aforesaid.

More specifically, the invention also contemplates the provision of a normally engaged clutch which operatively connects the cutter to the motor of the mower, together with appropriate linkage, etc., which is responsive to lowering of the movable wheel and causes the clutch to become automatically disengaged.

Another feature of the invention involves the provision of means for manually maintaining the aforementioned clutch engaged despite a tendency of the movable wheel to be lowered, whereby the cutter may be kept in operation under special circumstances, such as for example, when it is desired to raise the front end of the mower to cut tall grass.

Another feature of the invention resides in the provision of means for adjusting the cutter relative to the frame, that is, as to height above the ground, as required by the height of the grass being cut.

Another important feature of the invention resides in the provision of a modified embodiment which is adapted for use where it is not practical or possible an upwardly and downwardly movable actuating wheel, such as for example, in a self-propelled mower having power-driven wheels. In such instance the modified form of the invention utilizes a guard member which is movably mounted under the mower in surrounding or adjacent relation to the cutter and is operatively connected to the aforementioned clutch so as to disengage the same and stop rotation of the cutter when the guard member comes in contact with a foreign object such as, for example, the foot of the operator.

Some of the advantages of the invention reside in its simplicity of construction, dependable operation, and in its adaptability for use in lawn mowers of various sizes and types.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of a power lawn mower having the invention embodied therein, the left rear wheel of the mower being removed for illustrative purposes;

FIGURE 2 is an underside plan view of the mower;

FIGURE 3 is a cross-sectional view, taken substantially in the plane of the line 3—3 in FIGURE 2;

FIGURE 4 is a sectional detail on an enlarged scale, taken substantially in the plane of the line 4—4 in FIGURE 2;

FIGURE 5 is a sectional detail on an enlarged scale, taken substantially in the plane of the line 5—5 in FIGURE 2;

FIGURE 6 is a sectional view, taken substantially in the plane of the line 6—6 in FIGURE 5;

Figure 8:
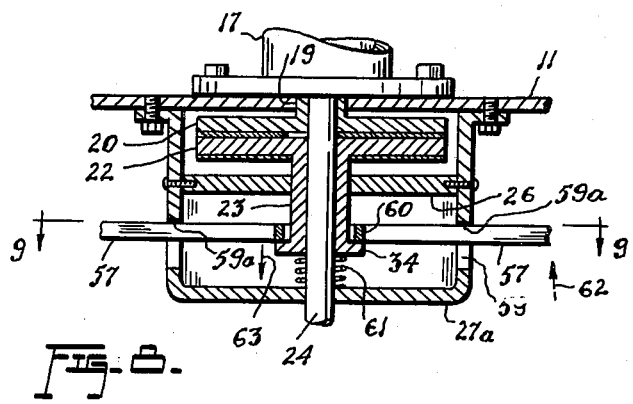
FIGURE 8 is a fragmentary vertical sectional view on an enlarged scale of the clutch and actuating guard member shown in FIGURE 7.

Referring now to the accompanying drawings in detail, the general reference numeral 10 designates a conventional power lawn mower, including the usual frame or bottomless housing 11 provided with a set of travelling wheels 12, 13, 14 and 15, and also provided with the usual handle 16, as will be readily apparent. A suitable engine or motor 17 is mounted on top of the frame for driving a cutter 18 which is rotatable under the frame in a horizontal plane.

As is best shown in FIGURE 5, the motor 17 rotates a shaft 19 which has a clutch driving disc 20 rotatable therewith, the disc 20 having a facing 21 engageable with a clutch plate 22 when the latter is in its raised or engaged position, as shown. The plate 22 is integral with a tubular boss 23 and, together therewith, is slidable upwardly and downwardly on a shaft 24 which has the cutter 18 suitably secured to its lower end. The shaft 24 is provided with a flat 24a and the boss 23 and plate 22 are similarly configurated so that the shaft is slidable relative to, but rotatable with the boss and plate. The upper end portion of the shaft 24 is cylindrical in form and is slidably as well as rotatably journalled in the clutch disc 20 and shaft 19.

If necessary or desirable, suitable means may be provided for normally sustaining the plate 22 in driving engagement with the disc 20, such as for example, a compression spring 24b.

The plate 22 is also provided with a facing 25 for engagement with a stationary plate 26 when the plate 22 is slid downwardly, whereby to provide a braking action for arresting rotation of the plate and shaft 24 when the clutch is disengaged. The entire clutch mechanism is contained in a suitable casing 27 secured to the underside of the frame 11, and the plate 26 is suitably fixed inside the casing, such as by the screws 28.

The sliding of the plate 22 is effected by a clutch operating arm 29 which extends transversely of the casing 27 through suitable slots provided in the latter, as indicated at 30, the arm 29 being pivoted intermediate the ends thereof to the casing by a pin 31. The portion of the arm 29 within the casing 27 is provided with a yoke 32 which straddles the boss 23 and is equipped with a pair of opposing pins 33, operatively engaging a shoulder 34 on the boss. It will be apparent from the foregoing that when the arm 29 is moved about the pivot 31 in the direction of the arrow 35, the clutch will be disengaged by disengagement of the plate 22 from the driving disc 20 and, moreover, rotation of the shaft 24 will be arrested by the braking action produced by engagement of the plate 22 with the stationary plate 26.

A suitable cutter height adjusting rod 36 extends downwardly into the casing 27 and is provided with an eye-portion 37 seated in a groove in the shaft 24, whereby the shaft 24 may be slid vertically to adjust the height of the cutter 18 above the ground in accordance with the height of the grass being cut. The rod 36, of course, is adjustable manually and any suitable means (not shown) may be employed for locking the same in a pre-adjusted position. The sliding movement of the shaft 24 for adjustment of the height of the cutter 18 is independent of the sliding movement of the plate 22 on the shaft 24 for engagement and disengagement of the clutch.

One end of the arm 29 is connected by a suitable universal joint, or the like, 38 to one end of a link 39 which is pivoted intermediate its ends to a bracket 40 at the underside of the frame 11. The other end of the link 39 is connected by a similar joint 41 to the free end of an arm 42 equipped with a stub shaft 43 which carries the aforementioned wheel 13. The shaft 43 is movable in and projects outwardly through an arcuate slot 44 formed in the side of the frame 11, whereby the wheel 13 is movable upwardly and downwardly relative to the frame, about an axis constituted by a shaft 45 to which the aforementioned arm 42 is secured. The shaft 45 is journalled in a casing 46 secured to the inside of the frame 11 and containing a spiral spring 47, one end of which is secured to the casing while its other end is anchored to the shaft 45 in such manner as to urge the arm 42 and the wheel 13 to its lowered position, as indicated by the arrows 48.

When the device is in operation and the mower travels over uneven ground, such as for example would cause the wheel 13 to drop and leave the adjacent portion of the frame 11 too high above the ground, the spring 47 acting through the lever 42 will cause the wheel 13 to be lowered to the ground relative to the frame. The lowering movement of the arm 42 will be transmitted by the link 39 to the arm 29 which, in turn, will cause the clutch 20, 22 to become disengaged and the brake 22, 26 to take effect, so that rotation of the cutter 18 is quickly and automatically arrested. In this manner, assurance will be had that the operator will not come in contact with stones, etc., flying from the cutter, or with the cutter itself. When the wheel 13 returns to its initial, raised position, the weight of the machine will automatically bring the clutch members 20, 22 into engagement.

The clutch actuating means are preferably provided on two wheels of the machine, such as on the diagonally opposite front and rear wheels 13, 14, while the other two wheels 12, 15 are mounted on stub shafts which are rigidly secured to the frame. Like the wheel 13, the wheel 14 is also carried by a pivoted arm 42 which is operatively connected by a link 49 to the aforementioned joint 38. The link 49 is pivoted to a bracket 50 at the inside of the frame, and the links 39, 49 as well as the arm 29 are suitably angulated so that they do not interfere with the rotation of the cutter 18.

Under certain conditions it may be desirable to operate the cutter while the frame 11 is abnormally raised off the ground, such as for example, while cutting exceptionally tall grass. The arrangement of the invention ordinarily would prevent such operation, but means are provided for facilitating the same. These means consist of a manual control including a Bowden cable 51 which is connected at one end thereof to a suitable lever 52 on the handle 16, while its other end is connected to the free end of the arm 29, as shown at 53. Thus, when it is desired to operate the mower with the frame raised and either of the wheels 13, 14, off the ground, the lever 52 may be pressed so that the Bowden cable 51 exerts a pull on the arm 29 in the direction of the arrow 54 and thereby maintains the clutch 20, 22 engaged despite any tendency of the movable wheels 13, 14, to be lowered.

Figure 9:
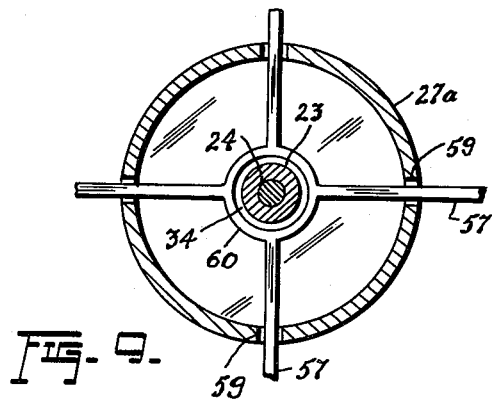
FIGURE 9 is a sectional view, taken substantially in the plane of the line 9—9 in FIGURE 8.
Figure 7:
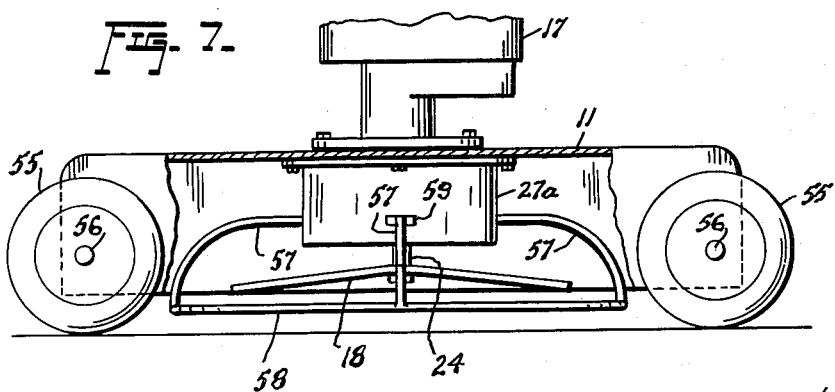
FIGURE 7 is a side elevational view of a mower, shown partly in section, embodying a modified form of the invention.

In some instances it is not practical or possible to employ vertically movable wheels for actuating the clutch, as for example, in the instance of self-propelled mowers wherein the wheels are power-driven. In such instances a modified embodiment of the invention may be used, as illustrated in FIGURES 7, 8 and 9. In this form of the invention the wheels 55 are carried by axles 56 journalled in the frame 11 in the conventional manner and the clutch actuating means comprise a guard member 58 which is disposed under the frame in surrounding relation to the cutter 18. The guard member 58 is preferably in the form of a ring and is supported by a set of radial arms 57 which extend upwardly and inwardly through openings 59 formed in the sides of the clutch casing 27a. The inner ends of the arms 57 are secured to an annulus 60 which engages the shoulder 34 of the boss 23, and a compression spring 61 is interposed on the shaft 24 between the lower end of the boss and the bottom of the casing 27a, as shown. The spring 61 not only normally maintains the clutch engaged, but also urges the arms 57 in abutment with the upper edges 59a of the openings 59.

When the mower is in use and the guard member 58 encounters some obstruction, such as for example, the foot of the operator, the guard member is raised at one side thereof, as illustrated for example by the arrow 62. With the upper edge 59a of the adjacent opening 59 providing a fulcrum, the guard member is rocked so that the opposite arm 57 is moved downwardly as indicated at 63, thus causing downward movement of the boss 23 and disengagement of the clutch. The arrangement of the guard member is such that it may be rocked in a universal manner in any direction, depending on the location of the obstruction relative to the guard, as will be apparent. However, if the mower is of the type which travels only in the forward direction, the guard member need not be ring-shaped and may be merely in the form of a segment provided forwardly of the cutter.

While in the foregoing there have been described and shown the preferred embodiments of the invention, various modifications may become apparent to those skilled in the art to which the invention relates. Accordingly, it is not desired to limit the invention to this disclosure and various modifications may be resorted to such as may lie within the spirit and scope of the appended claims.

What is claimed as new is:

1. In a power lawn mower, the combination of a wheeled frame, a motor mounted thereon, a horizontally rotatable cutter provided at the underside of said frame, a normally engaged clutch operatively connecting said cutter to said motor, an upwardly and downwardly movable guard member provided at the underside of the frame adjacent to and at least partially surrounding the path of rotary movement of said cutter, said guard member being adapted to be raised by coming in contact with an obstruction, and means responsive to raising of the guard member and operatively connecting the guard member to said clutch for automatically disengaging the latter when the guard member is raised by contact with an obstruction.

2. The device as defined in claim 1 wherein said clutch includes an axially slidable boss and an annular shoulder thereon, said means including an arm having said guard member mounted at one end thereof, fulcrum means provided intermediate the ends of said arm whereby the latter may rock in a vertical plane, an annulus provided at the other end of said arm and operatively engaging said shoulder on said boss whereby the boss may be slid to disengage the clutch when said guard member is raised, and resilient means engaging said boss for urging the clutch to its engaged position and simultaneously biasing said guard member downwardly.

3. The device as defined in claim 2 together with a clutch housing carried by said frame and provided at one side thereof with an opening having the intermediate portion of said arm extending therethrough, said arm rockably engaging said clutch housing at an edge of said opening whereby to provide said fulcrum means for said arm.

(References on following page)

References Cited in the file of this patent

UNITED STATES PATENTS

| | | |
|---|---|---|
| 1,190,166 | Herring | July 4, 1916 |
| 2,539,779 | Grosso | Jan. 30, 1951 |
| 2,551,817 | Taylor | May 8, 1951 |
| 2,692,466 | Brunts et al. | Oct. 26, 1954 |
| 2,707,858 | Norton et al. | May 10, 1955 |
| 2,710,514 | Broussard | June 14, 1955 |
| 2,721,432 | Machovec | Oct. 25, 1955 |

FOREIGN PATENTS

| | | |
|---|---|---|
| 1,113,159 | France | Nov. 28, 1955 |